US011007755B2

(12) United States Patent
Guderzo

(10) Patent No.: US 11,007,755 B2
(45) Date of Patent: May 18, 2021

(54) SELF-REPAIRING AND SELF-SEALING WATERPROOF MEMBRANE, FOR INSULATING BUILT STRUCTURES SUBJECTED TO HYDROSTATIC PRESSURE

(71) Applicant: VOLTECO S.P.A., Ponzano Veneto (IT)

(72) Inventor: Marco Guderzo, Treviso (IT)

(73) Assignee: VOLTECO S.P.A., Ponzano Veneto (IT)

(*) Notice: Subject to any disclaimer, the term of this patent is extended or adjusted under 35 U.S.C. 154(b) by 94 days.

(21) Appl. No.: 15/558,935

(22) PCT Filed: Mar. 16, 2016

(86) PCT No.: PCT/EP2016/055732
§ 371 (c)(1),
(2) Date: Sep. 15, 2017

(87) PCT Pub. No.: WO2016/146709
PCT Pub. Date: Sep. 22, 2016

(65) Prior Publication Data
US 2018/0079186 A1 Mar. 22, 2018

(30) Foreign Application Priority Data
Mar. 17, 2015 (IT) .......................... MI2015A000403

(51) Int. Cl.
*B32B 7/10* (2006.01)
*B32B 27/08* (2006.01)
(Continued)

(52) U.S. Cl.
CPC .............. *B32B 27/08* (2013.01); *B32B 5/022* (2013.01); *B32B 7/02* (2013.01); *B32B 7/10* (2013.01);
(Continued)

(58) Field of Classification Search
CPC ......... E02D 31/10; E02D 31/12; E02D 31/02; E02D 31/025; E02D 31/04;
(Continued)

(56) References Cited

U.S. PATENT DOCUMENTS 4,467,015 A     8/1984  Clem
2003/0195485 A1* 10/2003  Rangachari ....... A61F 13/15203
                                                     604/374
(Continued)

FOREIGN PATENT DOCUMENTS

EP          0278419 A2    8/1988
EP          0606700 A1    7/1994
(Continued)

OTHER PUBLICATIONS https://www.merriam-webster.com/dictionary/contiguous Accessed (Year: 2019).*
(Continued)

*Primary Examiner* — Alicia J Sawdon
(74) *Attorney, Agent, or Firm* — Cantor Colburn LLP

(57) ABSTRACT

A self-repairing and self-sealing waterproof membrane, for insulating built structures subjected to hydrostatic pressure, includes a first layer of hermetic polymeric material, which covers a second layer of water-expanding polymeric material, in which additives of polymeric and/or mineral origin are added, arranged in contact with the concrete surface of the structure. The second layer includes a plurality of sublayers which are contiguous and have different expanding actions and mechanical characteristics. The membrane has substantially the shape of a continuous flat sheet, which gives the membrane the appearance of a uniform film, having a thickness between 0.2 and 5.0 mm and being composed of one or more of the following polymers: TPE, TPO, TPU, EVA, EPDM, EPM, HDPE, MDPE, LDPE, PE, (Continued)

PVC and other elastomeric or polymeric polymers, containing optional additions of fillers and other ingredients to give the article the necessary requirements of workability, mechanical strength, and durability.

5 Claims, 6 Drawing Sheets

(51) Int. Cl.
| | |
|---|---|
| B32B 5/02 | (2006.01) |
| B32B 27/12 | (2006.01) |
| B32B 27/24 | (2006.01) |
| E02D 31/10 | (2006.01) |
| E04B 1/66 | (2006.01) |
| B32B 7/02 | (2019.01) |
| B32B 27/32 | (2006.01) |
| B32B 27/30 | (2006.01) |

(52) U.S. Cl.
CPC ............. *B32B 27/12* (2013.01); *B32B 27/24* (2013.01); *B32B 27/306* (2013.01); *B32B 27/32* (2013.01); *E02D 31/10* (2013.01); *E04B 1/665* (2013.01); *B32B 2307/7265* (2013.01); *B32B 2307/73* (2013.01); *B32B 2309/105* (2013.01); *B32B 2419/00* (2013.01)

(58) Field of Classification Search
CPC ..... B32B 2307/762; B32B 5/22; B32B 27/24; B32B 7/10; E04B 1/665
See application file for complete search history.

(56) References Cited

U.S. PATENT DOCUMENTS

| | | | |
|---|---|---|---|
| 2006/0009100 | A1 | 1/2006 | McGroarty |
| 2009/0100775 | A1* | 4/2009 | Trial .......................... E04D 5/10 |
| | | | 52/408 |
| 2011/0177736 | A1* | 7/2011 | Donovan .................. B32B 5/22 |
| | | | 442/148 |
| 2011/0197427 | A1 | 8/2011 | Weber et al. |
| 2012/0308780 | A1* | 12/2012 | Rottger .................... B01J 20/26 |
| | | | 428/172 |
| 2013/0022779 | A1 | 1/2013 | Schroeer et al. |
| 2015/0158244 | A1* | 6/2015 | Tibbits .................. B29C 61/003 |
| | | | 428/516 |

FOREIGN PATENT DOCUMENTS

| | | |
|---|---|---|
| EP | 2151317 B1 | 8/2014 |
| JP | 3197376 B2 | 8/2001 |
| JP | 2003166179 A | 6/2003 |
| JP | 2006037440 A | 2/2006 |
| WO | 2010088468 A2 | 8/2010 |

OTHER PUBLICATIONS

International Preliminary Report on Patentability dated May 11, 2016 re: Application No. PCT/EP2016/055732; pp. 1-18; citing: JP 2003 166179 A and EP 0 606 700 A.

International Search Report dated May 11, 2016 re: Application No. PCT/EP2016/055732; pp. 1-4; citing: JP 2003 166179 A, EP 0 606 700 A, WO 2010/088468 A2, JP 3 197 376 B2, US 2006/009100 A1, JP 2006 037440 A, and US 4 467 015 A.

Written Opinion dated May 11, 2016 re: Application No. PCT/EP2016/055732; pp. 1-7; citing: JP 2003 166179 A and EP 0 606 700 A.

* cited by examiner

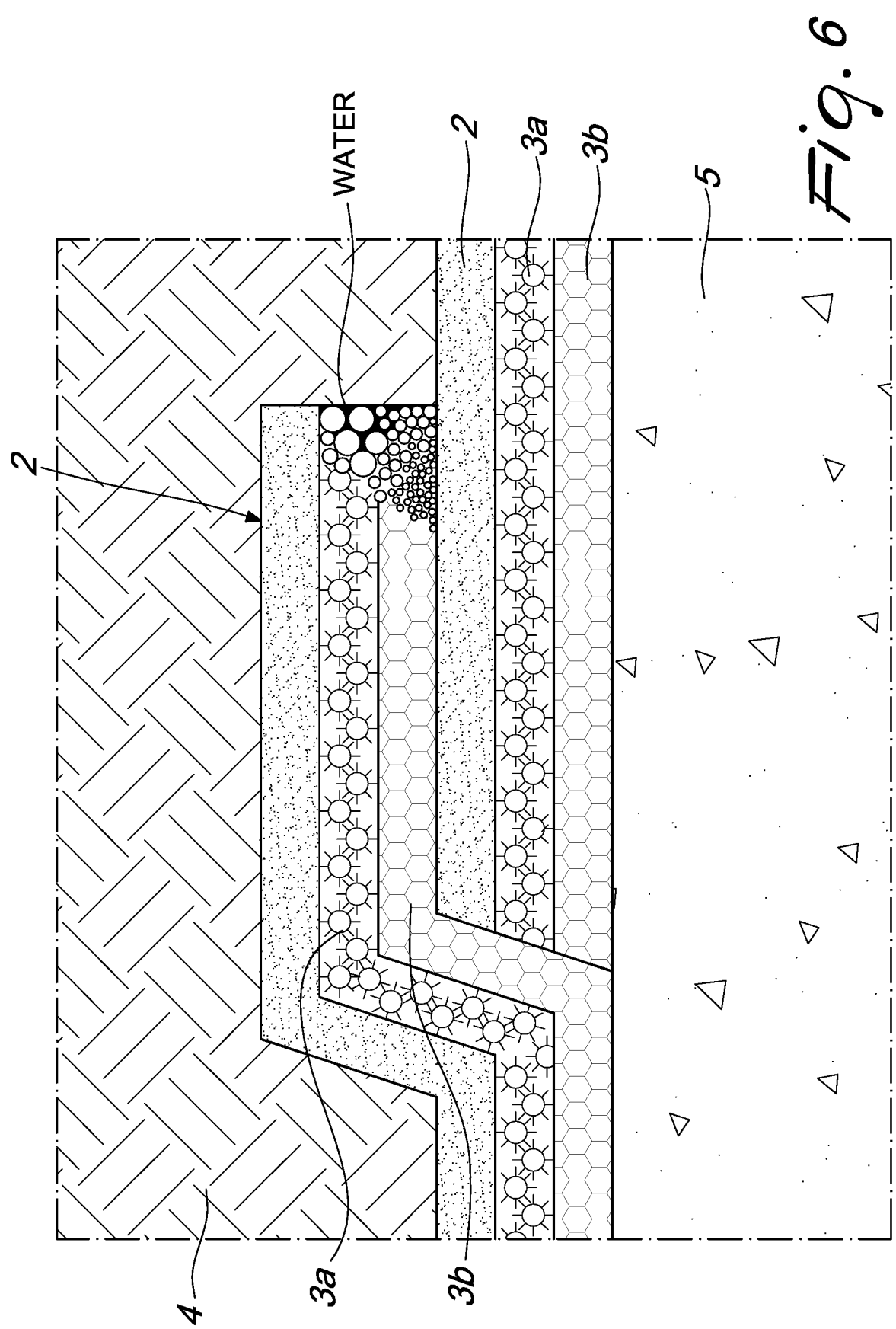

SELF-REPAIRING AND SELF-SEALING WATERPROOF MEMBRANE, FOR INSULATING BUILT STRUCTURES SUBJECTED TO HYDROSTATIC PRESSURE

TECHNICAL FIELD

The present disclosure relates to a self-repairing and self-sealing waterproof membrane for insulating built structures subjected to hydrostatic pressure.

BACKGROUND

Membranes of several kinds, adapted to insulate in theory the walls of a built structure in order to avoid water infiltrations are known in the construction sector.

Currently it is known to provide building structures by arranging mutually side by side a plurality of construction segments, usually made of reinforced concrete, which can be prefabricated and installed in place after their production, or obtained directly in place by means of concrete castings into appropriate formwork.

In order to stop water infiltrations which tend to rise from the ground in the interspace or channel defined between each pair of contiguous segments, it is known to spread between them appropriate resins, which once hardened constitute a barrier to such water infiltrations.

However, these resins suffer a drawback: once they have hardened, they in fact have a limited mechanical strength and are therefore often subject to breakage due to the mutual movements that occur between the segments that are connected to them and are due for example to the different thermal expansions to which said segments are subjected or to the settling movements of the ground.

Furthermore, since these resins can be used only if the two segments are very close to each other, they cannot be used to provide earthquake-resistant buildings; earthquake-resistance standards in fact, in order to avoid in case of an earthquake the phenomenon of hammering between two contiguous constructive segments, set high values for the minimum distance allowed between them, which therefore do not allow the use of these resins of the known type.

In the case of segments obtained directly in place, in order to limit water infiltrations it is also known to arrange, transversely to the interspace or channel defined between two contiguous segments, metallic sheets or strips of PVC (polyvinyl chloride) that have a generally approximately rectangular plan shape and are embedded, with their longitudinal ends, in the two segments at the time of their provision, so as to blend them and thus constitute a water infiltration barrier.

However, these sheets and strips of a known type suffer a drawback; in particular the metallic ones, but also the ones made of PVC, can in fact be deformed elastically only by a small extent and therefore are unable to follow the considerable dimensional variations of the channel defined between the two segments, which are due for example to the different thermal expansions thereof or to any movements of the ground; due to these dimensional variations, the sheets and strips can therefore crack and/or break easily, thus allowing the passage of water.

As a partial solution to this drawback, strips of plastic material are known the central region of which is tubular or bulb-shaped in order to facilitate the elastic deformations of said strip in the direction of the axis that joins the two segments; during the mutual movements of the two constructive segments blended by the strip, the central region of said strip can thus undergo elastic deformations even of a considerable extent and can therefore follow, without the danger of breaking, the dimensional variations of the channel defined between said segments.

Both this second type of strip and the ones described previously, however, suffer a drawback: for the purpose of fixing to the segments, which occurs in place during concrete casting, appropriate shapes are required the application of which is awkward and requires a long execution time.

Moreover, these solutions of a known type do not lend themselves to be used if the segments are prefabricated, since the strips cannot be fixed to them.

Moreover, in order to close completely the channel defined between two segments it is often necessary to mutually blend a plurality of strips arranged so as to be longitudinally aligned with each other; the connection between two contiguous strips occurs by mutually heat-sealing, for example by blowing air at high temperature or by means of an adapted heat-sealing plate, two transverse ends of the two strips, and this is awkward and dangerous and requires a long time and a certain skill on the part of the installation technician. Moreover, this heat-sealing cannot be performed in the presence of water in the channel defined between the two constructive segments.

Moreover, depending on the distance of the segments to be blended, on the pressure of the water to which they are subjected, and on the extent of the mutual movements provided for them, it may be necessary to use strips having different shapes and dimensions; it is therefore necessary to have a vast range of strips of different shapes and dimensions, and this has a negative effect on production, storage and transport costs thereof.

EP 0278419 is also known which discloses a waterproof membrane composed of a layer of clay, preferably bentonite, that is capable of swelling and is interposed between a layer of supporting felt and a covering layer preferably constituted by felt material.

All three layers are mutually assembled mechanically by tacking.

This membrane of a known type provides a waterproof sealing element in which both the supporting layer and the covering layer remain connected in a fixed manner during and after the expansion of the clay layer, so as to ensure a more compact packing of the expanded clay particles.

This known type of membrane, which is used mainly for sealing soils and landfills, is not devoid of drawbacks, which include the fact that in the case of reinforced concrete structures the layer of felt in contact with the concrete is unlikely to be saturated by the expanding material, allowing potential infiltrations of water that can occur between the concrete and the felt layer.

This drawback is observed in particular in the regions of overlap between two contiguous membranes, thus making said membrane completely ineffective.

US 20110197427A1 is also known which discloses a hermetic membrane which comprises a bather layer, a composite layer arranged on one side of the barrier layer, and a sealant, which is arranged in a mesh-like configuration between the composite layer and the barrier layer.

The composite layer is arranged directly in contact with the liquid concrete.

If a water leak through the barrier layer occurs, the sealant mesh should hinder or prevent the propagation of the infiltration to the contiguous surfaces, limiting the region affected by the damage and making it easy to locate and repair.

A first drawback that can be observed in the background art consists in the installation method of the hermetic membrane, which must be performed before the concrete castings so as to allow the liquid concrete to impregnate the composite layer; accordingly, this solution cannot be applied to already hardened concrete surfaces.

A second drawback that can be observed in the background art relates to the region of overlap of the sheets: in this region, the portion of the composite layer cannot be reached by the liquid concrete and therefore cannot be impregnated by it; a region of possible permeation of water, which would not be hindered in its propagation, is thus created.

A further drawback is due to the intermittence of the sealant layer, which does not ensure continuity in the sealing of the interface with the concrete, allowing again the propagation of water through the porosities of the concrete.

US20130022779A1 is also known which claims a sheet for use in the building sector for sealing holes, which comprises a flat sheet body that has at least one elastic sealing layer that is formed at least partially with a material that has sufficient elasticity and resilience, when the sealing layer is penetrated by a fixing element, to produce a sealing closure in an opening formed by the penetration of the fixing device.

Several alternatives are proposed for solving the problem of the insulation of walls against water infiltrations and multilayer systems are indicated in particular in which the body is a multilayer composite that has at least one membrane layer and at least one protective layer in addition to the sealing layer, or a layer of a closed-cell elastic foam, or a layer containing a viscoelastic gel, or microcapsules containing adhesives, or at least one adhesive, a sealant, a fluid resin and a material that expands when exposed to water or air, or a single- or two-component adhesive.

All these solutions are not ideal, since water can seep in any case due to the pressures involved.

This drawback can be observed more in overlap regions, which in order to avoid causing infiltrations must be sealed appropriately since they are not suitable for autonomous sealing.

Furthermore, in case of breakage of the membrane the infiltration might reach the concrete-membrane interface and allow the migration of the water along said membrane, thus spreading to the surrounding surfaces.

EP2151317B1 is also known which discloses a waterproof membrane, particularly for insulating built structures subjected to hydrostatic pressure, which comprises a first layer of water-expanding waterproof material that is adapted to cover the outer surface of at least one wall to be insulated of a built structure and a second layer of fibrous material that covers the first layer on the opposite side with respect to the wall to be insulated, and a plurality of filaments of the second layer that cross from side to side the first layer and can be embedded in the wall to be insulated from the mechanical grip of the first layer to the wall to be insulated.

This solution, also, suffers some small drawbacks, among which we note difficulty in achieving the mechanical coupling of the waterproof layer made of water-expanding rubber with a fibrous layer in which the filaments of said fibrous layer cross from side to side the waterproof rubber layer.

It has in fact been observed that water might diffuse through said filaments due to the expansion of the water-expanding rubber, which is unable/insufficient to stop the flow of water.

JP2003166179A is also known which discloses a membrane composed of a moisture-expanding sheet that comprises a nonwoven fabric, characterized by a draining structure, and a layer of bentonite in powder form.

This known art suffers the following drawbacks: the nonwoven fabric has a structure that is not waterproof and combination with bentonite, which is a natural clay, creates an expansion that is proportional to the absorption of water, which causes loss of the waterproofing capacity of the membrane as the expansion increases.

Moreover, in this membrane of the known type the components act separately, each for its own characteristics, without therefore cooperating to create a single amalgamation that is adapted to oppose the passage of water.

EP0606700 is also known which discloses a method for manufacturing a water barrier fabric that is composed of an upper mesh or sheet and a lower mesh or sheet, made of cardboard, glass fiber, fabric, waterproof polymeric sheet material, rope, mesh or other reinforcement, water barrier or stiffening material, which are identical or different and are incorporated within the water barrier fabric during manufacture in any desired combination.

In particular, an article can be manufactured that is composed of a central part made of material in powder or granular form, such as bentonite clay, which incorporates fibers and is arranged between the upper mesh or sheet and the lower mesh or sheet.

An article can also be manufactured which is instead composed of a material in powder or granular form, such as bentonite clay, which is arranged both above the upper sheet or mesh and in a central portion of the article, between the upper sheet or mesh and the lower sheet or mesh.

An article can also be manufactured which is instead composed of a material in powder or granular form, such as bentonite clay, which is incorporated within the lower half of the article and within a lower part of the central portion of the article between the lower mesh or sheet and the upper mesh or sheet.

In this article of a known type also the components act separately, each for its own characteristics, without therefore cooperating to create a single amalgamation that is adapted to oppose the passage of water.

Another drawback observed in this article resides in that the outer layer of fibers in the article or the external bentonite clay layer in the article, if it is in contact with the concrete, is unlikely to be saturated by the expanding material, allowing potential infiltrations of water that can occur between the concrete and the layer of fibers or bentonite.

SUMMARY

The aim of the present disclosure is therefore to solve the described technical problems, eliminating the drawbacks of the cited background art and thus by providing a membrane that allows to waterproof the walls while allowing at the same time to be self-repairing in case of accidental cutting or perforation of the membrane, self-sealing in the overlap regions created during installation for the joining of contiguous membranes, inhibiting the water flow that can be created between the membrane and the wall to be waterproofed (migration).

Within this aim, the disclosure provides perform installation in a simplified manner.

The disclosure further ensures continuity in the seal with the concrete, preventing the propagation of water through the porosities of said concrete.

The disclosure also provides a waterproof membrane according to the disclosure that is structurally simple and has low manufacturing costs.

In accordance with the disclosure, there is provided a self-repairing and self-sealing waterproof membrane as defined in the appended claims.

BRIEF DESCRIPTION OF THE DRAWINGS

Further characteristics and advantages of the disclosure will become better apparent from the detailed description of a particular but not exclusive embodiment illustrated by way of nonlimiting example in the accompanying drawings, wherein:

FIG. 6 is a view, similar to the preceding one, of the activation of the membrane due to the presence of water in the overlap region.

DETAILED DESCRIPTION OF THE DRAWINGS

Figure 1:
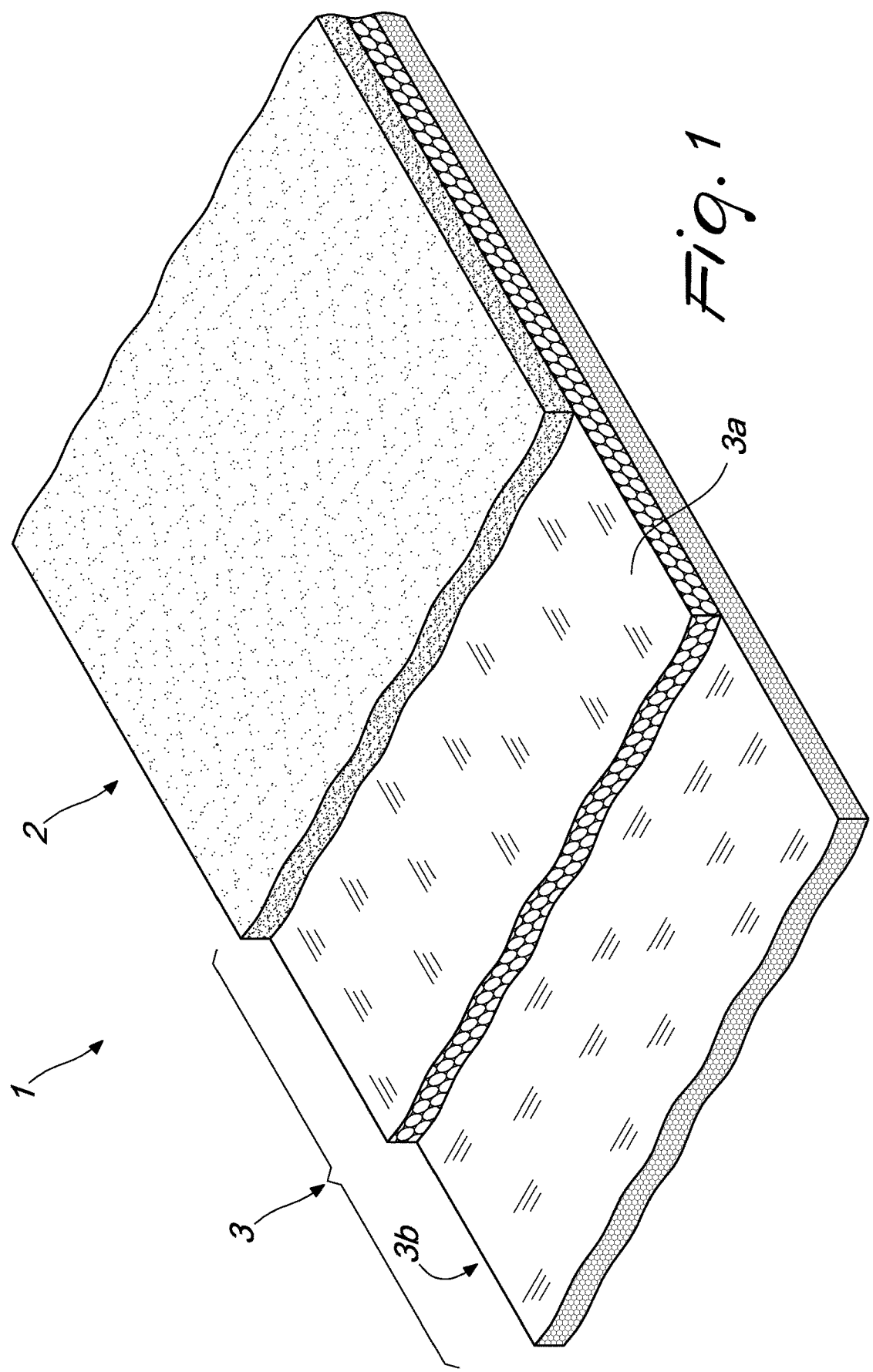
FIG. 1 is a sectional view of the stratification of the membrane.
Figure 2:
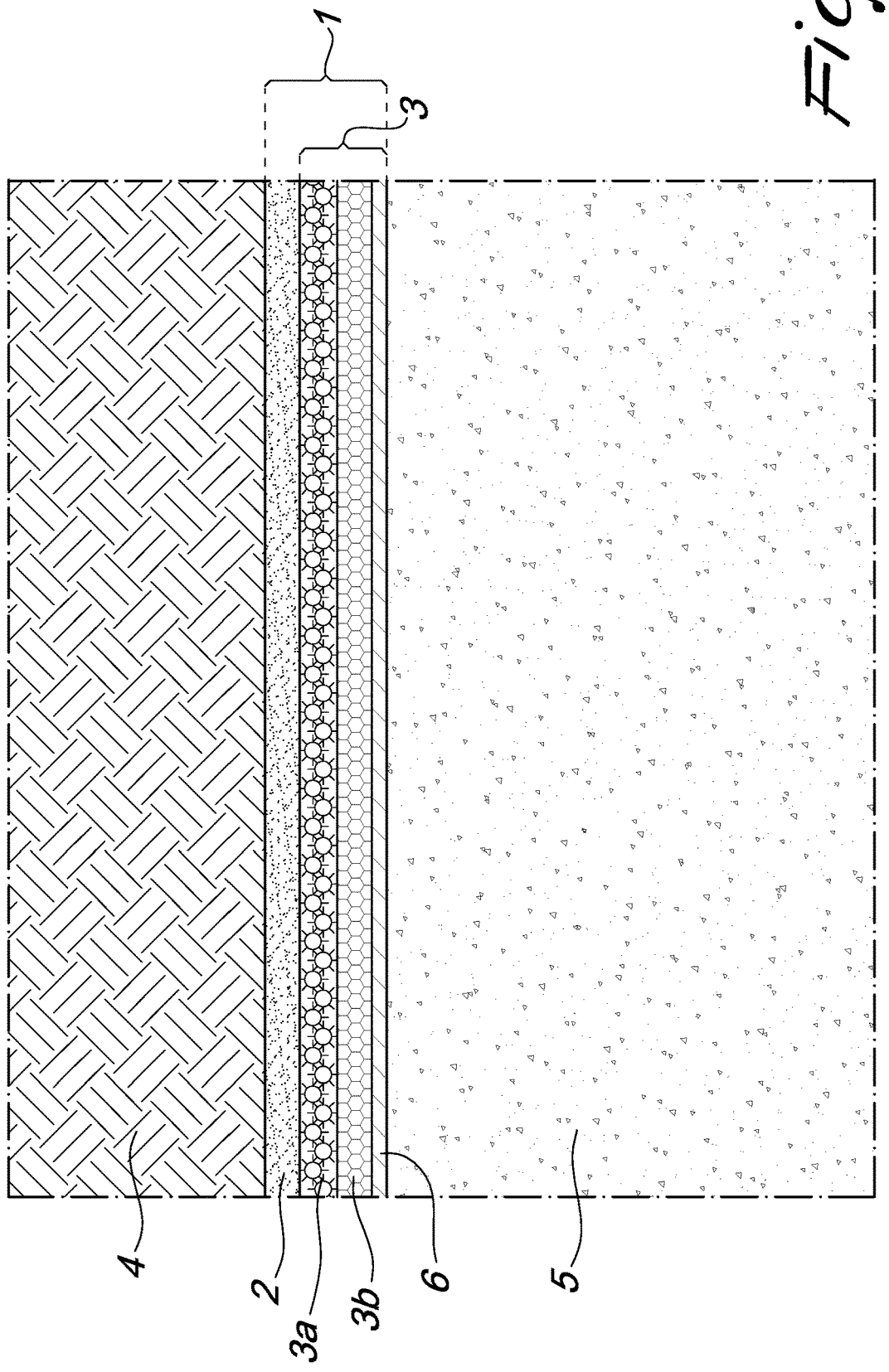
FIG. 2 is a stratigraphic view of the applied membrane.
Figure 3:
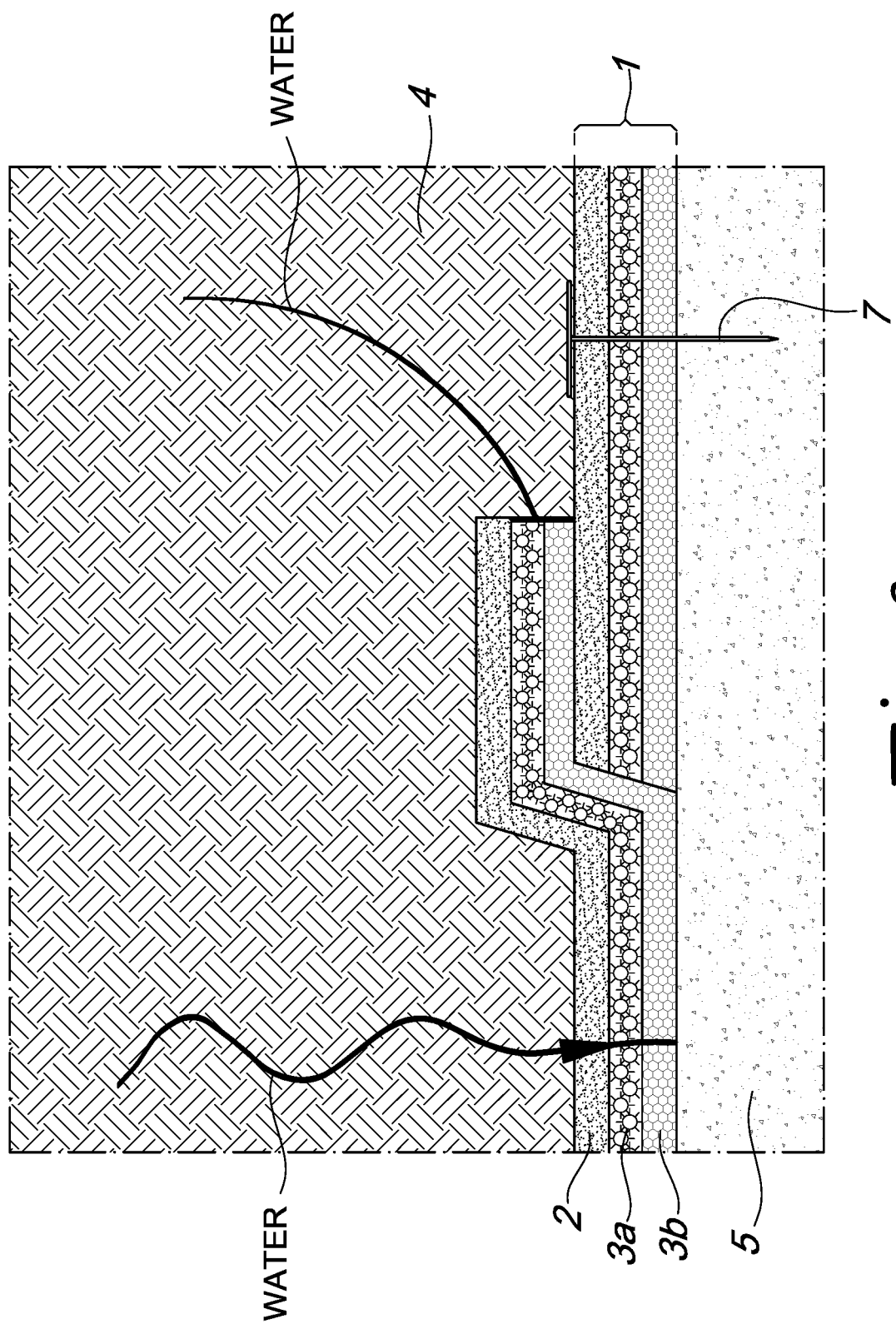
FIG. 3 is a sectional view of the application of the membrane in an overlap region.

In the exemplary embodiment that follow, individual characteristics, given in relation to specific examples, may actually be interchanged with other different characteristics that exist in other exemplary embodiments.

With reference to the figures, the numeral 1 designates a self-repairing and self-sealing waterproof membrane, according to the present application, particularly for the insulation of built structures subjected to hydrostatic pressure, which is constituted by a continuous flat sheet which gives it the appearance of a uniform film.

The membrane 1 is constituted by a first layer 2 of hermetic polymeric material, which is arranged in contact with an infiltrated surface 4 that affects said built structure.

The membrane 1 preferably has the shape of a continuous flat sheet with a thickness comprised between 0.2 and 5.0 mm, preferably comprised between 0.5 and 2.0 mm, and can be composed of one or more of the following polymers: TPE, TPO, TPU, EVA, EPDM, EPM, HDPE, MDPE, LDPE, PE, PVC and/or other polymers of an elastomeric or polymeric nature, containing optional additions of fillers and of other ingredients known in the art in order to give the article the necessary requirements of workability, mechanical strength and durability.

The first layer 2 covers a second layer 3 of water-expanding polymeric material placed in direct contact with the concrete surface 5 of said built structure.

The second layer 3 comprises a material that is capable to reacting to contact with water by expanding and is incorporated for example in a compound of polymers of a thermoplastic or elastomeric nature similar to those of the first layer 2.

In order to increase the expanding function of the second layer 3 it is possible to add in the polymeric compound additives of polymeric and/or mineral origin.

This mixture, differently from other expanding materials, such as for example clays, constitutes in itself already a physical barrier and, depending on the percentages of additives that are mixed, allows an expansion of the second layer 3 that is comprised (by way of example) between 100% and 800% of the initial volume.

The second layer 3 is advantageously composed for example of a first sublayer and a second sublayer 3a, 3b, which are contiguous and have different expanding actions.

The differentiation between the first sublayer 3a and the second sublayer 3b can be obtained for example by acting on the ingredients of the composition, in particular on the water-expanding agents and on the additives that allow to control their behavior.

This differentiation allows to control the expanding action of the second layer 3, at the same time maintaining the shape and waterproofing characteristics of said membrane 1; for example, the first sublayer 3a is assigned a greater expanding action than said second sublayer 3b, for example in order to increase the reactivity to water of the central part of the membrane 1.

The differentiation between the expanding action of the first sublayer 3a and of the second sublayer 3b further ensures higher stability of the membrane 1, since in contact with water the expanding force of the first sublayer 3a is contained between the first layer 2 and the second sublayer 3b, both of which have similar mechanical characteristics that allow the membrane 1 to develop its functions while maintaining its shape.

Use of the disclosure of the example described above can therefore be as follows: the use of the first sublayer 3a having a greater expanding action and of the second sublayer 3b having a smaller expanding capacity causes the second sublayer 3b to have a greater structural strength than the first sublayer 3a, which is adapted to give it a better dimensional stability with respect to the first sublayer 3a.

With the sandwich-like embodiment, the expanding force of the first sublayer 3a is in fact contained between the first hermetic layer 2 and the second sublayer 3b.

Upon contact with water, the expanding force of the first sublayer 3a, compressed between the infiltrated surface and the concrete surface, develops more greatly and more rapidly in the direction at right angles to the first layer 2 and to the second sublayer 3b, which, by way of the similar mechanical characteristics, allow the membrane 1 to achieve the above-cited tasks, further ensuring dimensional stability.

Figure 4:
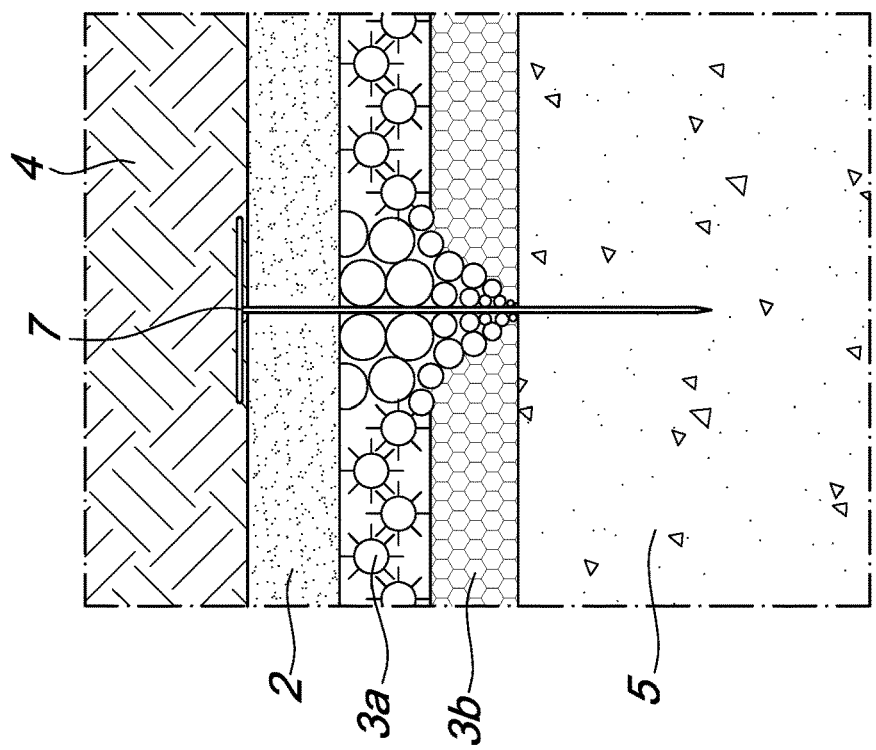
Figure 7:
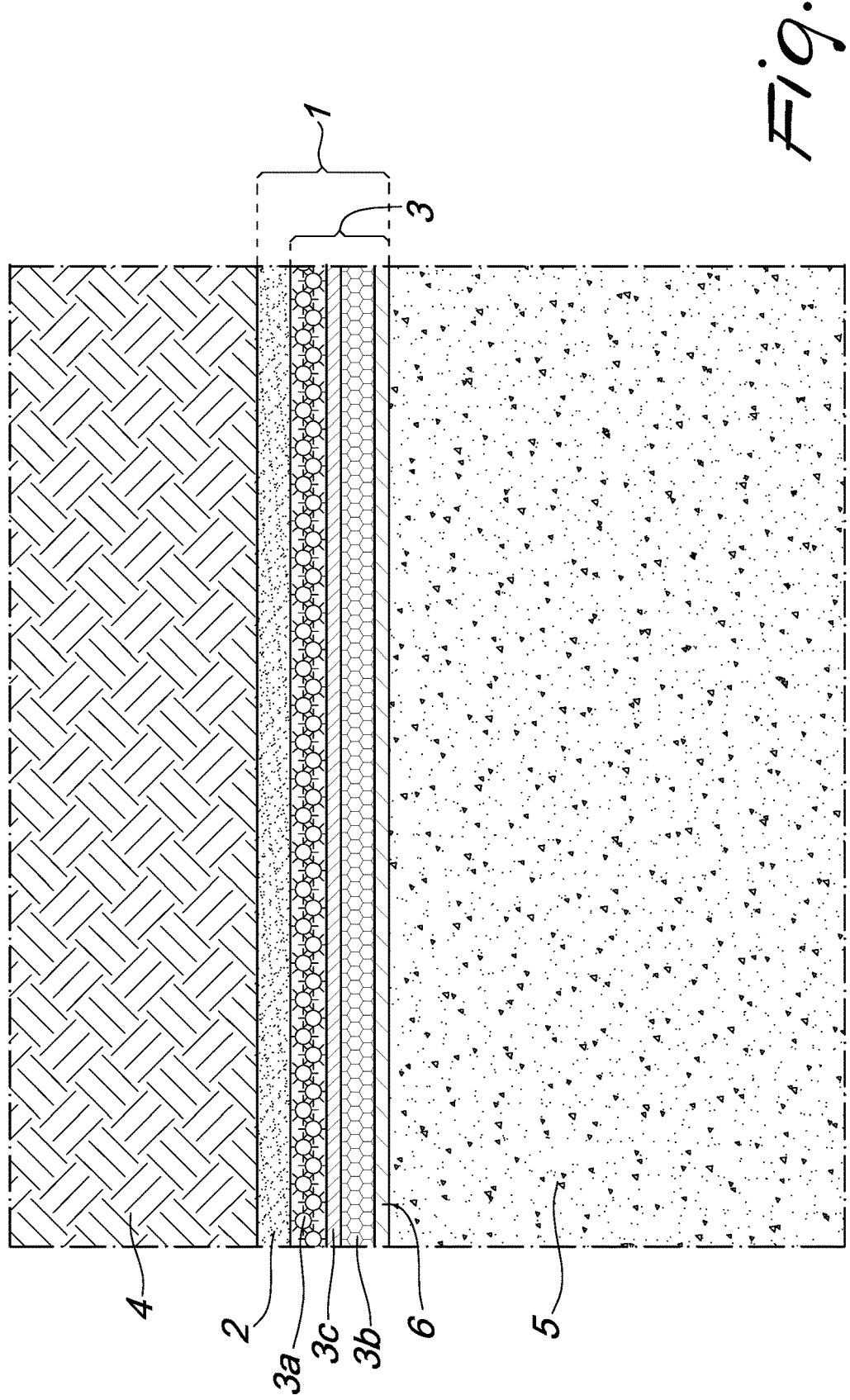
FIG. 7 is a view of a variation.

In the presence of a nail 7 or of another element that passes through the membrane 1, the different expanding action between the first sublayer 3a and the second sublayer 3b allows to generate, as shown in FIG. 4, an expansion in the direction of the second sublayer 3b that has the function of sealing the nail passage hole.

In particular, the expansion of the second layer 3b that presses against the concrete surface 5 prevents the propagation of the water to the contiguous surfaces.

Figure 5:
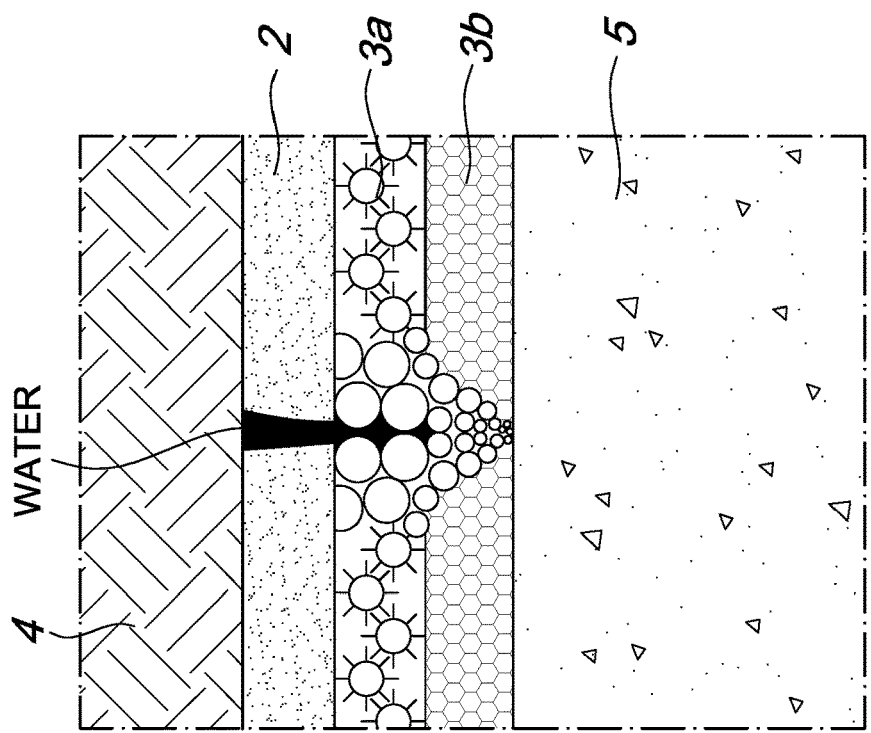
FIGS. 4 and 5 are views, similar to the preceding one, of the membrane following the insertion of a nail and following a tear.

Thus, if there is water in the overlap region between adjacent membranes 1, as shown in FIG. 5, due to the combined action of the first and second expanding sublayers 3a, 3b, the membrane 1 is compressed against the infiltrated surface 4 and the concrete surface 5, preventing the passage of water through the overlap region.

A further characteristic of the embodiment of the second layer 3 in a first sublayer 3a and a second sublayer 3b is to allow the outermost second sublayer 3b, which is dimensionally more stable than the first sublayer 3a, to mate with an additional porous layer, for example a nonwoven fabric 6, which allows adhesion to the liquid concrete when it is cast in direct contact.

The waterproof membrane 1 can be manufactured in many ways, with known technologies and with commercially available machines.

As mentioned in the introduction, the characteristics and the number of the layers that constitute the second layer 3 shown in the examples can be increased and interchanged for other exemplary embodiments.

Thus, for example, the second layer 3 can be increased further by inserting between the first sublayer and the second sublayer 3a, 3b an additional polymeric layer 3c in order to contain further the expanding substances incorporated in the first sublayer 3a, preventing them from being able to migrate into the second layer 3b.

This is done to keep unchanged over time the expansion characteristics of said first and second sublayers 3a, 3b.

The process can comprise a single step, for example extrusion or coextrusion, or a plurality of steps, which comprise spreading and/or lamination or hot-melt gluing of the individual layers.

It has thus been found that the disclosure has achieved the intended advantages by providing a membrane 1 which allows to waterproof walls, allowing at the same time to be self-repairing in case of accidental cutting or perforation of the membrane 1, self-sealing in the overlap regions created during installation for the joining of contiguous membranes, inhibiting the flow of water that can be created between the membrane 1 and the wall to be waterproofed (migration).

In particular, the expanding agents and the additives that act within the polymeric membrane 1 and in particular within the first and second polymeric sublayers 3a, 3b induce the expansion, at the same time maintaining the shape and waterproofness characteristics of the membrane 1.

Moreover, the differentiation between the first and second sublayers 3a, 3b allows to control the expanding action of the second layer 3 in order to increase the water reactivity of the central part of the membrane 1, at the same time ensuring greater stability of the membrane 1, since upon contact with water the expanding force of the first sublayer 3a is contained between the first layer 2 and the second sublayer 3b, both of which have similar mechanical characteristics which allow the membrane 1 to develop its functions while maintaining its shape.

It has also been found that the membrane 1 allows to provide the hydraulic seal between the overlaps of the deposited membranes, preventing interface migration between the concrete wall and membrane proper.

Furthermore, the membrane 1 does not require heat-sealing or taping or even the addition of external sealing and/or expanding materials for the joining of the several deposited sheets.

Furthermore, the installation of the membrane 1 occurs in a simplified manner and meets the requirements of installation simplicity that are needed in building yards and within work areas, since the unit weight of the membranes is lower than that of most traditional products of the known type.

The materials used, which constitute the individual components of the disclosure, as well as the composition and dimensions of the individual layers, may be parameters that are defined according to the specific requirements.

The several means for performing certain different functions need not certainly coexist only in the illustrated embodiment but can be present per se in many embodiments, including ones that are not illustrated.

The characteristics indicated as advantageous, convenient or the like may also be omitted or be replaced with equivalents.

The disclosures in Italian Patent Application No. MI2015A000403 (102015902338648) from which this application claims priority are incorporated herein by reference.

The invention claimed is:

1. A self-repairing and self-sealing waterproof membrane, for insulating built structures subjected to hydrostatic pressure, comprising a first layer consisting of a hermetic polymeric material layer, suitable to be arranged in contact with an infiltrated surface of said structure, which covers a second layer of water-expanding polymeric material, in which additives of polymeric and/or mineral origin are added, suitable to be arranged in contact with a concrete surface of said structure, said second layer being composed of at least one first sublayer and one second sublayer, each of said first and second sublayers consisting of a water-expanding polymeric material layer, and which are adjacent and have different expanding actions and mechanical characteristics, said membrane having substantially the shape of a continuous flat sheet, which gives the membrane the appearance of a uniform film, having a thickness comprised between 0.2 and 5.0 mm, each of said first layer and said first and second sublayers are composed of a same compound of polymers selected from one or more of the following polymers: TPE, TPO, TPU, EVA, EPDM, EPM, HDPE, MDPE, LDPE, PE, and PVC, each of said first and second sublayers of said second layer are further composed of a material that is capable of reacting to contact with water by expanding and being incorporated in said compound of polymers, the differentiation of the expanding action between said at least one first sublayer and one second sublayer being obtained by acting on said material that is capable of reacting to contact with water by expanding, wherein said first sublayer has a greater expanding action than said second sublayer in order to increase the water reactivity of the central part of said membrane, and said second sublayer has a smaller expanding action and a greater structural strength than said first sublayer thereby to be adapted to provide a greater dimensional stability than said first sublayer, wherein upon contact with water the swelling force of said first sublayer is developed more greatly and more rapidly in the direction at right angles to said first layer and to said second sublayer, and the expanding force of the first sublayer is contained between the first layer and the second sublayer.

2. The membrane according to claim 1, wherein said second layer is further composed of an additional polymeric layer that is adapted to contain more of the expanding substances incorporated within said first sublayer, preventing the expanding substances from being able to migrate into said second sublayer, in order to keep unchanged over time the expanding characteristics of said first and second sublayers.

3. The membrane according to claim 1, wherein in the presence of a nail or other through segment the different expanding action between said first sublayer and said second sublayer generates an expansion in the direction of said second sublayer that has the function of sealing the nail passage hole, preventing the propagation of water to adjacent surfaces.

4. The membrane according to claim 1, wherein in the presence of water in an overlap region of said first sublayer and said second sublayer, the combined action of said first sublayer and said second sublayer compresses said membrane against said infiltrated surface and said concrete surface, preventing the passage of water through the overlap region.

5. The membrane according to claim 1, wherein said first and second sublayers allow said second sublayer, which is dimensionally more stable than said first sublayer, to couple to an additional porous layer such as a nonwoven fabric.

\* \* \* \* \*